United States Patent
Watanabe et al.

(10) Patent No.: US 8,999,586 B2
(45) Date of Patent: Apr. 7, 2015

(54) ELECTRODE FOR NON-AQUEOUS ELECTROLYTE SECONDARY BATTERY, NON-AQUEOUS ELECTROLYTE SECONDARY BATTERY, AND METHOD FOR MANUFACTURING THE SAME

(71) Applicant: Hitachi, Ltd., Tokyo (JP)

(72) Inventors: Toshiyuki Watanabe, Ibaraki (JP); Kunihiko Koyama, Ibaraki (JP); Takahiro Furutani, Ibaraki (JP); Eri Kojima, Ibaraki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/778,937

(22) Filed: Feb. 27, 2013

(65) Prior Publication Data

US 2013/0244116 A1    Sep. 19, 2013

(30) Foreign Application Priority Data

Mar. 13, 2012    (WO) .................. PCT/JP2012/056347

(51) Int. Cl.
| | |
|---|---|
| H01M 2/16 | (2006.01) |
| H01M 2/18 | (2006.01) |
| H01M 4/133 | (2010.01) |
| H01M 4/134 | (2010.01) |
| H01M 4/139 | (2010.01) |
| H01M 10/42 | (2006.01) |
| H01M 10/052 | (2010.01) |

(52) U.S. Cl.
CPC .............. *H01M 4/133* (2013.01); *H01M 2/166* (2013.01); *H01M 2/1673* (2013.01); *H01M 2/18* (2013.01); *H01M 4/134* (2013.01); *H01M 4/139* (2013.01); *H01M 10/052* (2013.01); *H01M 10/4235* (2013.01)

(58) Field of Classification Search
None
See application file for complete search history.

(56) References Cited

U.S. PATENT DOCUMENTS

2007/0224493 A1    9/2007  Higuchi et al.
2011/0052987 A1    3/2011  Katayama et al.

FOREIGN PATENT DOCUMENTS

| CN | 101043090 A | 9/2007 |
|---|---|---|
| JP | 2010-27218 A | 2/2010 |
| JP | 2010-170770 A | 8/2010 |
| JP | 2010-267466 A | 11/2010 |
| JP | 2011-23186 A | 2/2011 |
| JP | 2011-243351 A | 12/2011 |
| WO | WO 2009/044741 A1 | 4/2009 |
| WO | WO 2012/005152 A1 | 1/2012 |

OTHER PUBLICATIONS

The definition of layer, retrieved from: (2011). In the american heritage(R) dictionary of the english language. Retrieved from http://search.credoreference.com/content/entry/hmdictenglang/layer/0, on Jun. 5, 2014.*
International Search Report issued in PCT/JP2012/056347, mailed on May 22, 2012.
Office Action for JP Application 2012-5222307, dated Sep. 18, 2012.
The Office Action, dated Dec. 29, 2014, issued in the corresponding Chinese Patent Application No. 201310077874.2.

* cited by examiner

*Primary Examiner* — Cynthia K. Walls
(74) *Attorney, Agent, or Firm* — Birch, Stewart, Kolasch & Birch, LLP

(57) ABSTRACT

The present invention relates to an electrode for a non-aqueous electrolyte secondary battery, a non-aqueous electrolyte secondary battery using the electrode, and a method for manufacturing the non-aqueous electrolyte secondary battery. The electrode for a non-aqueous electrolyte secondary battery includes a material mixture layer containing an active material and a porous insulating layer. The insulating layer is formed on the material mixture layer. The insulating layer contains a resin having a cross-linked structure and inorganic particles. A mixed layer that includes components of the insulating layer and components of the material mixture layer is provided at the interface between the insulating layer and the material mixture layer.

21 Claims, 7 Drawing Sheets

ELECTRODE FOR NON-AQUEOUS ELECTROLYTE SECONDARY BATTERY, NON-AQUEOUS ELECTROLYTE SECONDARY BATTERY, AND METHOD FOR MANUFACTURING THE SAME

BACKGROUND OF THE INVENTION

1. Field of the Invention

The present invention relates to an electrode for a non-aqueous electrolyte secondary battery that can be easily produced and has excellent load characteristics and charge-discharge cycle characteristics, a non-aqueous electrolyte secondary battery using the electrode, and a method for manufacturing the non-aqueous electrolyte secondary battery.

2. Description of Related Art

A non-aqueous electrolyte secondary battery such as a lithium ion secondary battery is characterized by a high energy density and thus has been widely used as a power source for portable equipment such as a portable telephone and a notebook personal computer. It is increasingly important to improve various battery characteristics and safety as the performance of the portable equipment becomes higher.

In the current lithium ion secondary battery, e.g., a polyolefin-based porous film with a thickness of about 10 to 30 μm is used as a separator that is interposed between a positive electrode and a negative electrode. However, when this polyolefin-based porous film is produced, complicated processes such as biaxial orientation and the extraction of a pore-forming agent are required to make fine and uniform pores. Under the present circumstances, therefore, the cost of production is high, and the separator is expensive.

Polyethylene having a melting point of about 120 to 140° C. is used as a material of the separator to ensure a so-called shutdown effect. During the shutdown, the resin constituting the separator is melted at a temperature not more than the abnormal heat generation temperature of the battery, and the pores of the separator are closed. This increases the internal resistance of the battery, thereby improving the safety of the battery when a short circuit or the like occurs. However, e.g., if the temperature of the battery is further raised after the shutdown, the molten polyethylene is likely to flow, and the separator can be broken, which is so-called meltdown. In such a case, the positive electrode and the negative electrode are brought into direct contact, and the temperature of the battery becomes even higher, so that the inside of the battery may be in a dangerous state.

In order to prevent a short circuit due to the meltdown, a method has been proposed that uses a heat-resistant separator in which ceramic particles are applied to a polyethylene microporous film, or a separator composed of a heat-resistant resin. For example, JP 2010-170770 A discloses a non-aqueous electrolyte secondary battery including a positive electrode, a negative electrode, and a separating material that is formed on the surface of the positive electrode or the negative electrode, has a cross-linked structure, and functions as a separator. The technology disclosed in JP 2010-170770 A can improve the safety of the non-aqueous electrolyte secondary battery at a high temperature.

Even in the case of the non-aqueous electrolyte secondary battery with improved safety and reliability (particularly safety and reliability at a high temperature), as described above, it is expected that the load characteristics and the charge-discharge cycle characteristics will need to be further improved, e.g., as the performance of the applicable equipment becomes higher in the future. Moreover, the productivity will also need to be improved. In this respect, there is yet room for improvement in the technology of JP 2010-170770 A.

With the foregoing in mind, the present invention provides an electrode for a non-aqueous electrolyte secondary battery with excellent load characteristics and charge-discharge cycle characteristics, a non-aqueous electrolyte secondary battery using the electrode, and a method for manufacturing the non-aqueous electrolyte secondary battery.

SUMMARY OF THE INVENTION

An electrode for a non-aqueous electrolyte secondary battery of the present invention includes a material mixture layer containing an active material and a porous insulating layer. The insulating layer is formed on the material mixture layer. The insulating layer contains a resin having a cross-linked structure and inorganic particles. A mixed layer that includes components of the insulating layer and components of the material mixture layer is provided at the interface between the insulating layer and the material mixture layer.

A non-aqueous electrolyte secondary battery of the present invention includes a positive electrode that includes a material mixture layer containing a positive electrode active material, a negative electrode that includes a material mixture layer containing a negative electrode active material, and a non-aqueous electrolyte. At least one electrode selected from the positive electrode and the negative electrode includes a porous insulating layer. The insulating layer is formed on the material mixture layer. The insulating layer contains a resin having a cross-linked structure and inorganic particles. A mixed layer that includes components of the insulating layer and components of the material mixture layer is provided at the interface between the insulating layer and the material mixture layer.

According to a method for manufacturing a non-aqueous electrolyte secondary battery of the present invention, the non-aqueous electrolyte secondary battery includes a positive electrode that includes a material mixture layer containing a positive electrode active material, a negative electrode that includes a material mixture layer containing a negative electrode active material, an insulating layer, and a non-aqueous electrolyte, and the method includes the following: preparing a composition for forming an insulating layer that includes oligomers and monomers that can be polymerized by energy ray irradiation, inorganic particles, and a solvent; applying the composition for forming an insulating layer to the material mixture layer of at least one electrode selected from the positive electrode and the negative electrode to form a coating; and forming a porous insulating layer on the material mixture layer by irradiating the coating with an energy ray to form a resin having a cross-linked structure while the coating is dried so as to remove the solvent. The solvent includes a low-boiling solvent having a boiling point of 50° C. or higher and lower than 170° C. and a polar parameter of 4.0 or more, and a high-boiling solvent having a boiling point of 170° C. or higher. A content of the high-boiling solvent in the composition for forming an insulating layer is 1 to 13 vol %. The composition for forming an insulating layer has a viscosity of 5 to 50 mPa·s.

The present invention can provide an electrode for a non-aqueous electrolyte secondary battery with excellent load characteristics and charge-discharge cycle characteristics, a non-aqueous electrolyte secondary battery using the electrode, and a method for manufacturing the non-aqueous electrolyte secondary battery.

DETAILED DESCRIPTION OF THE INVENTION

Embodiment 1

Figure 1:
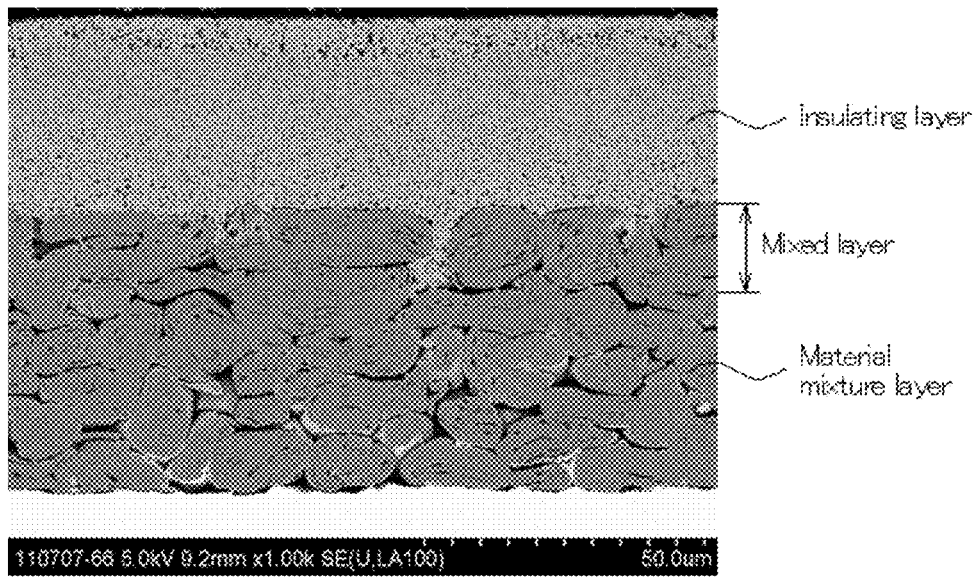
FIG. 1 is a scanning electron micrograph showing an example of a cross section of an electrode that includes a porous insulating layer and is used for a non-aqueous electrolyte secondary battery of the present invention.

First, an electrode for a non-aqueous electrolyte secondary battery and a non-aqueous electrolyte secondary battery of the present invention will be described.

An electrode for a non-aqueous electrolyte secondary battery of the present invention includes a material mixture layer containing an active material and a porous insulating layer. The insulating layer is formed on the material mixture layer. The insulating layer contains a resin having a cross-linked structure and inorganic particles. A mixed layer that includes components of the insulating layer and components of the material mixture layer is provided at the interface between the insulating layer and the material mixture layer.

A first aspect of a non-aqueous electrolyte secondary battery of the present invention includes a positive electrode that includes a material mixture layer containing a positive electrode active material, a negative electrode that includes a material mixture layer containing a negative electrode active material, and a non-aqueous electrolyte. At least one electrode selected from the positive electrode and the negative electrode includes a porous insulating layer. The insulating layer is formed on the material mixture layer. The insulating layer contains a resin having a cross-linked structure, inorganic particles, and a thermoplastic resin. A mixed layer that includes components of the insulating layer and components of the material mixture layer is provided at the interface between the insulating layer and the material mixture layer.

A second aspect of a non-aqueous electrolyte secondary battery of the present invention includes a positive electrode that includes a material mixture layer containing a positive electrode active material, a negative electrode that includes a material mixture layer containing a negative electrode active material, and a non-aqueous electrolyte. At least one electrode selected from the positive electrode and the negative electrode includes a porous insulating layer. The insulating layer is formed on the material mixture layer. The insulating layer contains a resin having a cross-linked structure and inorganic particles. A mixed layer that includes components of the insulating layer and components of the material mixture layer is provided at the interface between the insulating layer and the material mixture layer. A porous thermoplastic resin layer containing a thermoplastic resin is formed on at least one of a surface of the insulating layer of the electrode that is provided with the insulating layer and a surface of the material mixture layer of the electrode that is not provided with the insulating layer.

With the above configurations, the non-aqueous electrolyte secondary battery can have excellent load characteristics and charge-discharge cycle characteristics.

Insulating Layer

The insulating layer is porous and is formed on the material mixture layer of at least one electrode selected from the positive electrode and the negative electrode. In the battery structure, when the negative electrode is located opposite the positive electrode so as to prevent leakage during the intercalation and deintercalation of lithium from the positive electrode, the area of the negative electrode is generally larger than that of the positive electrode in view of a dimensional tolerance of the electrodes or a displacement of the electrodes as they are wound or laminated. From this point of view, it is preferable that the insulating layer is formed on the material mixture layer of the negative electrode. When the material mixture layer is formed on both sides of the electrode, the insulating layer is also preferably formed on both sides of the electrode. When the material mixture layer is formed on one side of the electrode, the insulating layer is also preferably formed on one side of the electrode. The porosity of the insulating layer is not particularly limited as long as the insulating layer is permeable to the electrolytic solution to be used, and is generally about 30 to 75%.

It is preferable that the insulating layer has a surface roughness Ra of 0.2 to 0.4 μm. The surface roughness Ra is preferably 0.4 μm or less so as to prevent a fine powder of a constituent of the insulating layer from falling off the surface of the insulating layer during the manufacture of the battery, to suppress clogging of the pores of the insulating layer with the fine powder, and thus to prevent a reduction in the load characteristics of the battery. The surface roughness Ra is preferably 0.2 μm or more so as to prevent the pores of the insulating layer from being crushed when the insulating layer is calendered to adjust the surface roughness Ra, and thus to prevent a reduction in the load characteristics of the battery. In the present specification, the surface roughness Ra may be obtained by using a scanning white-light interferometer (e.g., "NewView 5030" manufactured by Zygo Corporation), measuring five points in an area of 0.36 mm×0.27 mm, performing image analysis on each of the points to determine the surface roughness, and calculating the average of those values of the surface roughness as the surface roughness Ra.

If the thickness of the insulating layer is too small, the insulation properties are reduced. If the thickness of the insulating layer is too large, the volumetric energy density of the battery is reduced. Therefore, the thickness of the insulating layer is preferably 3 to 50 μm.

The insulating layer of the first aspect contains the resin having the cross-linked structure, the inorganic particles, and the thermoplastic resin. The insulating layer of the second aspect contains the resin having the cross-linked structure and the inorganic particles, and may further contain the thermoplastic resin.

(Resin Having Cross-Linked Structure)

The resin having the cross-linked structure (referred to as a resin (A) in the following) is a resin that has a cross-linked structure in part. Therefore, even if the temperature in the non-aqueous electrolyte secondary battery including the insulating layer of the present invention is high, the insulating layer is not likely to shrink or to be deformed by the melting of the resin (A), and thus is maintained in a good shape. This can suppress the occurrence of a short circuit between the positive electrode and the negative electrode. Accordingly, the non-aqueous electrolyte secondary battery including the insulating layer of the present invention has excellent safety at a high temperature.

The glass transition temperature (Tg) of the resin (A) is higher than 0° C., preferably 10° C. or higher and is lower than 80° C., preferably 60° C. or lower. When the resin (A) has the Tg in the above range, favorable pores can be formed in the insulating layer, and the lithium ion permeability of the insulating layer can be improved. Therefore, the charge-discharge cycle characteristics and the load characteristics of the non-aqueous electrolyte secondary battery can be enhanced. If the Tg of the resin (A) is too low, the rigidity is reduced in the working environment at about room temperature. That is, the insulating layer is easily deformed by the external pressure or the like, and the pores are easily filled, making it difficult to adjust the lithium ion permeability of the insulating layer. If the Tg of the resin (A) is too high, curing and shrinkage occur during the production of the insulating layer, and favorable pores are not likely to be formed. Consequently, it is still difficult to adjust the lithium ion permeability of the insulating layer.

It is preferable that the resin (A) can be obtained by irradiating oligomers, which can be polymerized by energy ray irradiation, with an energy ray and polymerizing the oligomers. When the resin (A) is formed by the polymerization of the oligomers, the insulating layer can have high flexibility and resistance to peeling as it is joined to the electrode. Moreover, it becomes easy to control the Tg of the resin (A) in the above range.

It is preferable that monomers that can be polymerized by energy ray irradiation are used together with the oligomers to form the resin (A).

The production of the insulating layer containing the resin (A) preferably includes the following steps: preparing a composition for forming an insulating layer that includes the oligomers or the like for forming the resin (A), a solvent, etc.; applying the composition to the electrode to form a coating; and irradiating the coating with the energy ray to form the resin (A). In this case, when the monomers are added along with the oligomers to the composition for forming an insulating layer, the viscosity of the composition can be easily controlled, and the application properties of the composition to the electrode can be improved, thus imparting superior properties to the insulating layer. Moreover, the use of the monomers facilitates the control of the cross-linking density of the resin (A), so that the Tg of the resin (A) is also easier to control.

Specific examples of the resin (A) include the following: an acrylic resin composed of acrylic resin monomers (alkyl (meth)acrylates such as methyl methacrylate and methyl acrylate and their derivatives) and oligomers of these monomers and a cross-linking agent; a cross-linked resin composed of urethane acrylate and a cross-linking agent; a cross-linked resin composed of epoxy acrylate and a cross-linking agent; and a cross-linked resin composed of polyester acrylate and a cross-linking agent. In the above resins, the cross-liking agents may be divalent or polyvalent acrylic monomers (difunctional acrylate, trifunctional acrylate, tetrafunctional acrylate, pentafunctional acrylate, hexafunctional acrylate, etc.) such as tripropylene glycol diacrylate, 1,6-hexanediol diacrylate, tetraethylene glycol diacrylate, polyethylene glycol diacrylate, dioxane glycol diacrylate, tricyclodecane dimethanol diacrylate, ethylene oxide modified trimethylolpropane triacrylate, dipentaerythritol pentaacrylate, caprolactone modified dipentaerythritol hexaacrylate, and ε-caprolactone modified dipentaerythritol hexaacrylate.

When the resin (A) is the acrylic resin, the oligomers of any of the above acrylic resin monomers can be used as the oligomers that can be polymerized by energy ray irradiation (simply referred to as "oligomers" in the following); and any of the above acrylic resin monomers and cross-linking agents can be used as the monomers that can be polymerized by energy ray irradiation (simply referred to as "monomers" in the following).

Moreover, when the resin (A) is the cross-linked resin composed of the urethane acrylate and the cross-linking agent, the urethane acrylate can be used as the oligomers, and any of the above cross-linking agents can be used as the monomers.

On the other hand, when the resin (A) is the cross-linked resin composed of the epoxy acrylate and the cross-linking agent, the epoxy acrylate can be used as the oligomers, and any of the above cross-linking agents can be used as the monomers.

Further, when the resin (A) is the cross-linked resin composed of the polyester acrylate and the cross-linking agent, the polyester acrylate can be used as the oligomers, and any of the above cross-linking agents can be used as the monomers.

For the synthesis of the resin (A), at least two of the urethane acrylate, the epoxy acrylate, and the polyester acrylate may be used as the oligomers, and at least two of the difunctional acrylate, the trifunctional acrylate, the tetrafunctional acrylate, the pentafunctional acrylate, and the hexafunctional acrylate may be used as the cross-linking agents (monomers).

Examples of the resin (A) also include the following: a cross-linked resin derived from an unsaturated polyester resin that includes a mixture of an ester composition and styrene monomers, the ester composition being produced by the condensation polymerization of dihydric or polyhydric alcohol and a dicarboxylic acid; and various polyurethane resins produced by the reaction between polyisocyanate and polyol.

When the resin (A) is the cross-linked resin derived from the unsaturated polyester resin, the above ester composition can be used as the oligomers, and the styrene monomers can be used as the monomers.

When the resin (A) is the various polyurethane resins produced by the reaction between polyisocyanate and polyol, the polyisocyanate may be, e.g., hexamethylene diisocyanate, phenylene diisocyanate, toluene diisocyanate (TDI), 4,4'-diphenylmethane diisocyanate (MDI), isophorone diisocyanate (IPDI), or bis-(4-isocyanatocyclohexyl)methane, and the polyol may be, e.g., polyether polyol, polycarbonate polyol, or polyester polyol.

Thus, when the resin (A) is the various polyurethane resins produced by the reaction between polyisocyanate and polyol, any of the above polyols can be used as the oligomers, and any of the above polyisocyanates can be used as the monomers.

For the formation of the resin (A) in each of the above examples, monofunctional monomers such as isobornyl acrylate, methoxypolyethylene glycol acrylate, and phenoxypolyethylene glycol acrylate also can be used together. Therefore, when the resin (A) has a structure derived from these monofunctional monomers, any of the above monofunctional monomers can be used as the monomers along with the oligomers and the other monomers, as described above.

However, the monofunctional monomers are likely to remain as unreacted substances in the resin (A) thus formed, and there is a risk that the unreacted substances remaining in the resin (A) will dissolve in the non-aqueous electrolyte of the non-aqueous electrolyte secondary battery and impair the cell reaction. Therefore, the oligomers and the monomers used to form the resin (A) preferably have not less than two functional groups. Also, the oligomers and the monomers used to form the resin (A) preferably have not more than six functional groups.

To further facilitate the control of the Tg, when both the oligomers and the monomers are used to form the resin (A), the mass ratio of the oligomers and the monomers is preferably 20:80 to 95:5, and more preferably 65:35 to 90:10. That is, in the resin (A) composed of the oligomers and the monomers, the mass ratio of units derived from the oligomers and units derived from the monomers is preferably 20:80 to 95:5, and more preferably 65:35 to 90:10.

The content of the resin (A) in the insulating layer is preferably 35 to 75 vol %. If the content of the resin (A) is less than 35 vol %, the adhesive strength between the electrode and the insulating layer is insufficient, so that the insulating layer easily comes off. On the other hand, if the content of the resin (A) is more than 75 vol %, the pores are not likely to be formed, so that the formation of a porous layer is difficult. Moreover, the load characteristics of the battery tend to be low.

(Inorganic Particles)

When the insulating layer contains the inorganic particles (referred to as inorganic particles (B) in the following), the strength and dimensional stability of the insulating layer can be further improved.

Specific examples of the inorganic particles (B) include the following: particles of inorganic oxides such as an iron oxide, silica ($SiO_2$), alumina ($Al_2O_3$), $TiO_2$ (titania), and $BaTiO_3$; particles of inorganic nitrides such as an aluminum nitride and a silicon nitride; particles of hardly-soluble ionic crystals such as a calcium fluoride, a barium fluoride, and a barium sulfate; particles of covalent crystals such as silicon and diamond; and fine particles of clays such as montmorillonite. The inorganic oxide particles may be fine particles of materials derived from the mineral resources such as boehmite, zeolite, apatite, kaoline, mullite, spinel, olivine, and mica or artificial products of these materials. Moreover, the inorganic particles may be electrically insulating particles obtained by covering the surface of a conductive material with a material having electrical insulation (e.g., any of the above inorganic oxides). Examples of the conductive material include conductive oxides such as a metal, $SnO_2$, and an indium tin oxide (ITO) and carbonaceous materials such as carbon black and graphite. The above examples of the inorganic particles may be used individually or in combination of two or more. Among the above examples of the inorganic particles, the inorganic oxide particles are more preferred, and alumina, titania, silica, and boehmite are even more preferred.

As the inorganic particles (B), the insulating layer also may contain particles of an inorganic compound (e.g., a sodium hydrogen carbonate or a potassium hydrogen carbonate) that decomposes and generates a non-flammable gas such as a carbonic acid gas when the temperature rises. In the case of the insulating layer containing this compound, the non-flammable gas is generated when the battery reaches a high temperature. Due to the pressure of the gas generated, the positive electrode and the negative electrode are separated from each other to increase the internal resistance, and thus the reaction of the battery can be stopped. In other words, the shutdown function can be performed by incorporating the above compound into the insulating layer, where the action of the compound is different from that of the thermoplastic resin as will be described later. Since the compound generates the non-flammable gas at a temperature lower than the temperature at which a flammable gas is generated by the volatilization of the non-aqueous electrolytic solution, the generation of the flammable gas also can be suppressed, and the safety of the battery can be further improved.

The average particle size of the inorganic particles (B) is preferably 0.001 μm or more, and more preferably 0.1 μm or more. Moreover, the average particle size of the inorganic particles (B) is preferably 15 μm or less, and more preferably 6 μm or less. The average particle size of the inorganic particles (B) can be defined as a number average particle size that is measured, e.g., with a laser diffraction particle size analyzer (e.g., "LA-920" manufactured by Horiba, Ltd.) by dispersing the inorganic particles (B) in a medium, in which the particles are insoluble.

The inorganic particles (B) may be, e.g., either in the form of substantially spherical particles or in the form of plate-like or fibrous particles. In terms of improving the short circuit resistance of the insulating layer, the inorganic particles (B) are preferably plate-like particles or particles having a secondary particle structure in which primary particles are agglomerated. Particularly, in terms of improving the porosity of the insulating layer, the particles having the secondary particle structure are more preferred. Typical examples of the plate-like particles and the secondary particles include alumina or boehmite plate-like particles and alumina or boehmite secondary particles.

The content of the inorganic particles (B) in the insulating layer of the first aspect may be determined so that the total content of the inorganic particles (B) and the thermoplastic resin (as will be described later) is 25 to 65 vol %. The content of the inorganic particles (B) in the insulating layer of the second aspect may be 25 to 65 vol %. When the content of the inorganic particles (B) falls within the above range, the heat resistance of the insulating layer can be maintained, thus eliminating the possibility of a short circuit due to the detachment of the insulating layer.

(Thermoplastic Resin)

In terms of further improving the safety of the non-aqueous electrolyte secondary battery used, the insulating layer of the first aspect contains the thermoplastic resin (referred to as a thermoplastic resin (C) in the following) having a melting point of 100° C. to 170° C., preferably 110° C. to 160° C., and more preferably 120° C. to 150° C. so as to provide the insulating layer with the shutdown function. In the insulating layer having the shutdown function, when heat is generated in the non-aqueous electrolyte secondary battery, the thermoplastic resin (C) melts and fills the pores of the insulating layer, so that the progress of an electrochemical reaction can be suppressed.

The thermoplastic resin (C) has a melting point, i.e., a melting temperature of 100° C. to 170° C. measured with a differential scanning calorimeter (DSC) according to the regulations of the Japanese Industrial Standards (JIS) K 7121. The thermoplastic resin (C) is preferably a material that has electrical insulation, that is stable to the non-aqueous electrolyte of the non-aqueous electrolyte secondary battery or a solvent used in the production of the insulating layer, and that is also electrochemically stable and less susceptible to oxidation-reduction in the operating voltage range of the non-aqueous electrolyte secondary battery. Specific examples of the thermoplastic resin (C) include the following: polyethylene (PE); polypropylene (PP); copolymerized polyolefin; a polyolefin derivative (such as chlorinated polyethylene); a polyolefin wax; a petroleum wax; and a carnauba wax. The copolymerized polyolefin may be, e.g., an ethylene-vinyl monomer copolymer. More specifically, the copolymerized polyolefin may include an ethylene-propylene copolymer, an ethylene-vinyl acetate copolymer (EVA), and an ethylene-acrylic acid copolymer such as an ethylene-methyl acrylate copolymer or an ethylene-ethyl acrylate copolymer. It is desirable that the structural units derived from ethylene in the copolymerized polyolefin are 85 mol % or more. Further, polycycloolefin or the like also can be used. The above examples of the thermoplastic resin (C) may be used individually or in combination of two or more.

Among the above materials, the PE, the polyolefin wax, the PP, or the EVA in which the structural units derived from ethylene are 85 mol % or more is suitably used as the thermoplastic resin (C). The thermoplastic resin (C) may optionally include various types of known additives (an antioxidant etc.), which are to be added to the resin.

The shape of the thermoplastic resin (C) is not particularly limited, but preferably in the form of fine particles. The particle size of the fine particles of the thermoplastic resin (C) should be smaller than the thickness of the insulating layer in a dry state, and the average particle size is preferably $1/100$ to $1/3$ of the thickness of the insulating layer. Specifically, the average particle size is preferably 0.1 to 20 µm. If the particle size of the thermoplastic resin (C) particles is too small, the space between the particles is reduced, and the ion conduction path becomes longer. Thus, the characteristics of the non-aqueous electrolyte secondary battery may be degraded. If the particle size of the thermoplastic resin (C) particles is too large, the space between the particles is increased, which in turn may reduce the effect of improving resistance to a short circuit caused by lithium dendrites or the like. The average particle size of the thermoplastic resin (C) particles can be defined as a number average particle size that is measured, e.g., with a laser diffraction particle size analyzer (e.g., "LA-920" manufactured by Horiba, Ltd.) by dispersing the fine particles of the thermoplastic resin (C) in a medium (water etc.), in which the thermoplastic resin (C) does not swell.

In the insulating layer of the first aspect, the proportion of the thermoplastic resin (C) is preferably 10 to 50 vol % of the total volume of the thermoplastic resin (C) and the inorganic particles (B). If the proportion is less than 10 vol %, the shutdown function is reduced. If the proportion is more than 50 vol %, the amount of the inorganic particles (B) is reduced, so that the heat resistance becomes lower. Thus, it is difficult to maintain the shape of the insulating layer, and a short circuit may occur.

Mixed Layer

The mixed layer that includes components of the insulating layer and components of the material mixture layer is formed at the interface between the insulating layer and the material mixture layer. In the present specification, the mixed layer indicates a surface region of the material mixture layer that includes a portion in which the insulating layer enters a void formed in the material mixture layer and extends in an anchor-shaped fashion around the end, when viewed in a cross section along the lamination direction of the insulating layer and the material mixture layer. The mixed layer can be formed, e.g., by allowing a certain amount or more of the composition for forming an insulating layer to penetrate into the void of the material mixture layer. The presence of the mixed layer at the interface between the insulating layer and the material mixture layer can improve the bonding strength between the insulating layer and the electrode. The thickness of the mixed layer, i.e., the penetration depth of the insulating layer from the surface of the material mixture layer is not particularly limited, but preferably 3 µm or more, and more preferably 5 µm or more so as to increase the effect of improving the bonding strength. On the other hand, the thickness of the mixed layer is preferably 15 µm or less, and more preferably 10 µm or less so as to prevent a decrease in the void fraction of the material mixture layer caused by the penetration of the insulating layer.

Figure 2:
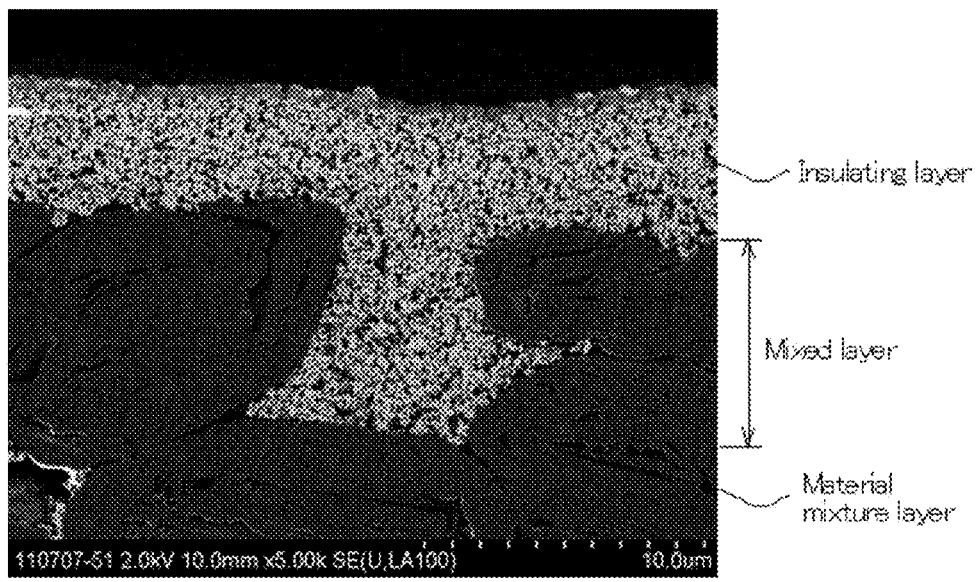
FIG. 2 is a scanning electron micrograph showing an enlarged cross section of a mixed layer formed at the interface between an insulating layer and a material mixture layer of an electrode that is different from the electrode shown in FIG. 1.
Figure 3:
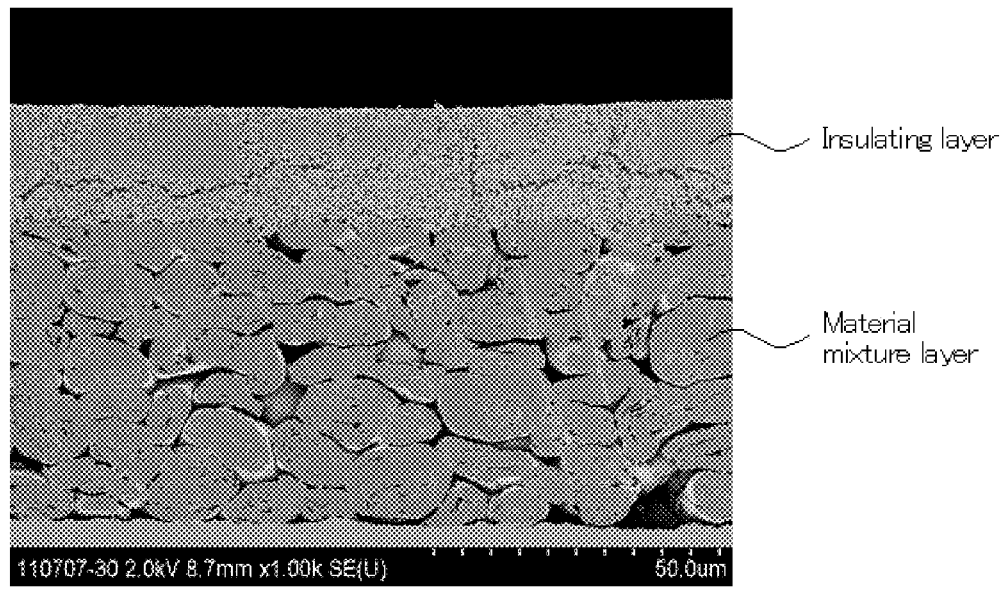
FIG. 3 is a scanning electron micrograph showing a cross section of an electrode that does not have a mixed layer at the interface between an insulating layer and a material mixture layer.

The mixed layer can be confirmed by observing the cross sections of the insulating layer and the electrode with a scanning electron microscope (SEM). FIG. 1 is a scanning electron micrograph showing an example of a cross section of an electrode that is used for the non-aqueous electrolyte secondary battery of the present invention. As shown in FIG. 1, a porous insulating layer is provided on a material mixture layer, and a mixed layer is formed at the interface between the insulating layer and the material mixture layer. FIG. 2 is a scanning electron micrograph showing an enlarged cross section of a mixed layer of an electrode that is different from the electrode shown in FIG. 1. As shown in FIG. 2, an insulating layer enters a void formed in a material mixture layer and extends in an anchor-shaped fashion around the end. FIG. 3 is a scanning electron micrograph showing a cross section of an electrode that has a porous insulating layer on a material mixture layer, but does not have a mixed layer at the interface between the insulating layer and the material mixture layer. In the electrode shown in FIG. 3, although the insulating layer is formed in accordance with the unevenness of the surface of the material mixture layer, the insulating layer does not enter the voids of the material mixture layer, and thus the mixed layer is not formed.

Thermoplastic Resin Layer

In the second aspect, the porous thermoplastic resin layer containing the thermoplastic resin is formed on at least one of a surface of the insulating layer of the electrode that is provided with the insulating layer and a surface of the material mixture layer of the electrode that is not provided with the insulating layer. The insulating layer of the second aspect does not contain the thermoplastic resin. However, the formation of the thermoplastic resin layer can provide the shutdown function. Therefore, the thermoplastic resin may be a thermoplastic resin having a melting point of 100° C. to 170° C., preferably 110° C. to 160° C., and more preferably 120° C. to 150° C., i.e., the thermoplastic resin (C) as described above.

The insulating layer of the first aspect contains the thermoplastic resin. However, it is preferable that the thermoplastic resin layer is further formed on at least one of a surface of the insulating layer of the electrode that is provided with the insulating layer and a surface of the material mixture layer of the electrode that is not provided with the insulating layer. This configuration allows the shutdown function to be performed more effectively.

The thickness of the thermoplastic resin layer is not particularly limited, but may be 1 to 15 μm.

Insulating Resin Layer

It is preferable that an insulating resin layer is further disposed on at least a part of the end portion of the electrode. It is particularly preferable that the insulating resin layer is disposed at the position corresponding to a current collector tab of the counter electrode or the self-electrode. With this configuration, even if the current collector tab is in close proximity to the counter electrode between the adjacent electrodes, the occurrence of a short circuit can be prevented. In order to ensure the insulation properties, it is preferable that the insulating resin layer covers the end portion of the electrode and is in the form of a rectangle with a width of 0.1 mm or more from the end portion. It is more preferable that the width is 0.2 mm or more. In order to prevent a reduction in the conductivity of the electrode, the width is preferably 3 mm or less, and more preferably 2 mm or less. The length of the rectangular insulating resin layer may be at least the width of the corresponding current collector tab. The thickness of the insulating resin layer is not particularly limited, but preferably is sufficient to cover a burr on the edge of the electrode or a protrusion of the material mixture layer, and may be, e.g., in the range of 1 μm to 50 μm.

The resin of the insulating resin layer is not particularly limited as long as it is a material that has electrical insulation, that is stable to the non-aqueous electrolyte of the non-aqueous electrolyte secondary battery, and that is also electrochemically stable and less susceptible to oxidation-reduction in the operating voltage range of the non-aqueous electrolyte secondary battery. For example, the resin of the insulating resin layer may be a thermosetting resin or an energy ray-setting resin (the above resin (A) or the like). The insulating resin layer can be formed in such a manner that the resin having the electrical insulation is applied to the end portion of the electrode, and then cured and dried by a predetermined method.

Figure 4A:
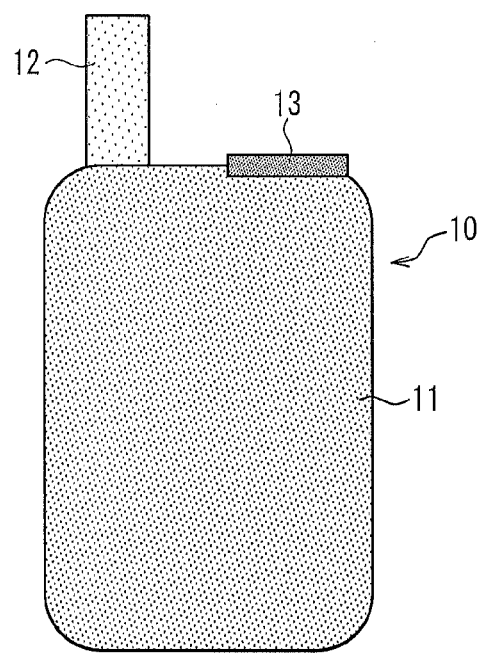
FIG. 4A is a plan view showing a state in which an insulating resin layer is formed on the upper end portion of a negative electrode.
Figure 4B:
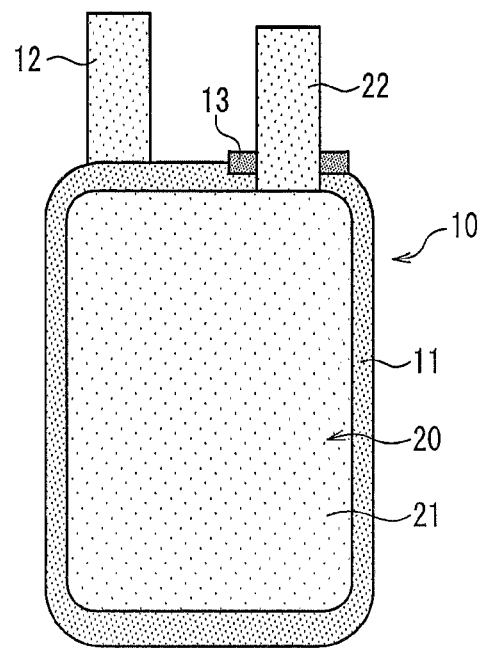
FIG. 4B is a plan view showing a state in which the negative electrode and a positive electrode are laminated together.

Next, the insulating resin layer will be described based on the drawings. FIG. 4A is a plan view showing a state in which the insulating resin layer is formed on the upper end portion of a negative electrode. FIG. 4B is a plan view showing a state in which the negative electrode and a positive electrode are laminated together. In FIGS. 4A and 4B, a negative electrode 10 includes a negative electrode body 11 in which the insulating layer is formed on the entire surface of the material mixture layer, a current collector tab 12, and an insulating resin layer 13. A positive electrode 20 includes a positive electrode body 21 in which the insulating layer is not formed on the material mixture layer, and a current collector tab 22. FIGS. 4A and 4B show an example in which the insulating resin layer is disposed at the position corresponding to the current collector tab of the counter electrode (positive electrode).

Figure 5A:
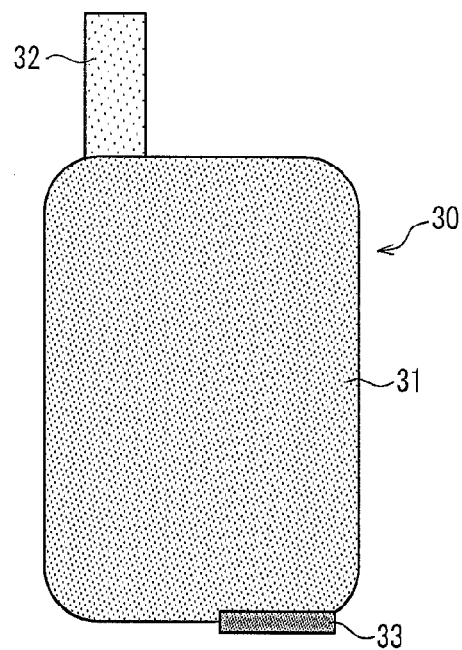
FIG. 5A is a plan view showing a state in which an insulating resin layer is formed on the lower end portion of a negative electrode.
Figure 5B:
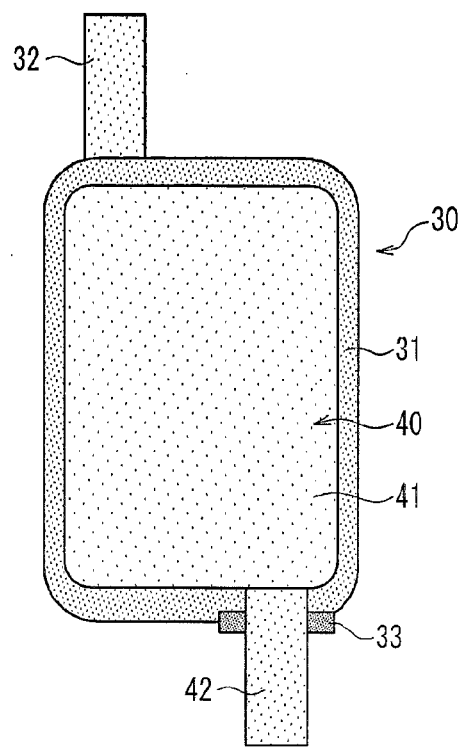
FIG. 5B is a plan view showing a state in which the negative electrode and a positive electrode are laminated together.

FIG. 5A is a plan view showing a state in which the insulating resin layer is formed on the lower end portion of a negative electrode. FIG. 5B is a plan view showing a state in which the negative electrode and a positive electrode are laminated together. In FIGS. 5A and 5B, a negative electrode 30 includes a negative electrode body 31 in which the insulating layer is formed on the entire surface of the material mixture layer, a current collector tab 32, and an insulating resin layer 33. A positive electrode 40 includes a positive electrode body 41 in which the insulating layer is not formed on the material mixture layer, and a current collector tab 42. FIGS. 5A and 5B also show an example in which the insulating resin layer is disposed at the position corresponding to the current collector tab of the counter electrode (positive electrode).

Figure 6A:
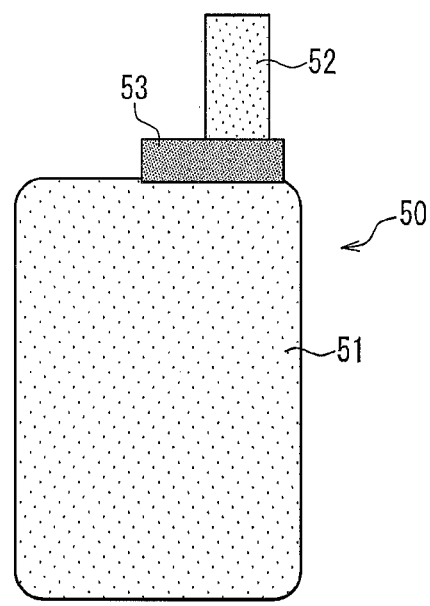
FIG. 6A is a plan view showing a state in which an insulating resin layer is formed on the upper end portion of a positive electrode.
Figure 6B:
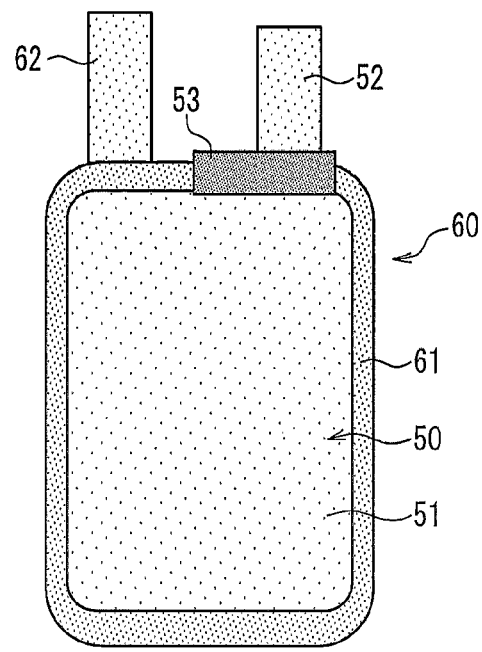
FIG. 6B is a plan view showing a state in which the positive electrode and a negative electrode are laminated together.

FIG. 6A is a plan view showing a state in which the insulating resin layer is formed on the upper end portion of a positive electrode. FIG. 6B is a plan view showing a state in which the positive electrode and a negative electrode are laminated together. In FIGS. 6A and 6B, a positive electrode 50 includes a positive electrode body 51 in which the insulating layer is not formed on the material mixture layer, a current collector tab 52, and an insulating resin layer 53. A negative electrode 60 includes a negative electrode body 61 in which the insulating layer is formed on the entire surface of the material mixture layer, and a current collector tab 62. FIGS. 6A and 6B show an example in which the insulating resin layer is disposed at the position corresponding to the current collector tab of the self-electrode (positive electrode).

Positive Electrode

The positive electrode may have a structure in which, e.g., a positive electrode material mixture layer that includes a positive electrode active material, a conductive assistant, a binder, and the like is provided on one side or both sides of a current collector.

The positive electrode active material is not particularly limited as long as it is an active material capable of intercalating and deintercalating Li ions. Examples of the positive electrode active material include the following: a lithium-containing transition metal oxide having a layered structure expressed as $Li_{1+x}MO_2$ ($-0.1<x<0.1$, M: Co, Ni, Mn, Al, Mg, etc.); a lithium manganese oxide having a spinel structure expressed as $LiMn_2O_4$ or other formulas in which a part of the elements of $LiMn_2O_4$ is substituted with another element; and an olivine-type compound expressed as $LiMPO_4$ (M: Co, Ni, Mn, Fe, etc.). Specific examples of the lithium-containing transition metal oxide having the layered structure include $LiCoO_2$, $LiNi_{1-x}Co_{x-y}Al_yO_2$ ($0.1 \leq x \leq 0.3$, $0.01 \leq y \leq 0.2$), and oxides containing at least Co, Ni, and Mn (such as $LiMn_{1/3}Ni_{1/3}Co_{1/3}O_2$, $LiMn_{5/12}Ni_{5/12}Co_{1-6}O_2$, and $LiNi_{3/5}Mn_{1/5}Co_{1/5}O_2$).

The conductive assistant may be a carbon material such as carbon black. The binder may be a fluorocarbon resin such as polyvinylidene fluoride (PVDF).

The current collector may be, e.g., a metal foil, a punching metal, a mesh, or an expanded metal made of aluminum or the like. In general, an aluminum foil with a thickness of 10 to 30 μm can be suitably used.

The positive electrode has a current collector tab. The current collector tab is generally provided in the following manner. A part of the current collector remains exposed without forming the positive electrode material mixture layer when the positive electrode is produced, and thus this exposed portion can serve as the current collector tab. However, the current collector tab does not necessarily need to be integrated with the current collector from the beginning and may be provided by connecting an aluminum foil or the like to the current collector afterward.

Negative Electrode

The negative electrode may have a structure in which, e.g., a negative electrode material mixture layer that includes a negative electrode active material, a binder, and optionally a conductive assistant is provided on one side or both sides of a current collector.

The negative electrode active material is not particularly limited as long as it is a material capable of intercalating and deintercalating lithium ions. For example, the negative electrode active material may be one type of carbon materials capable of intercalating and deintercalating lithium ions such as graphite, pyrolytic carbon, coke, glassy carbon, a calcined organic polymer compound, mesocarbon microbeads (MCMB), and a carbon fiber, or a mixture of two or more types of the carbon materials. Examples of the negative electrode active material also include the following: elements such as silicon (Si), tin (Sn), germanium (Ge), bismuth (Bi), antimony (Sb), and indium (In) and their alloys; compounds that can be charged/discharged at a low voltage close to lithium metal such as a lithium-containing nitride and a lithium-containing oxide; a lithium metal; and a lithium/aluminum alloy.

As the negative electrode active material, it is particularly preferable that a graphite carbon material and a material containing silicon (Si) as a constituent element are used in combination. This can provide the non-aqueous electrolyte secondary battery with high capacity and excellent charge-discharge cycle characteristics and load characteristics.

Examples of the graphite carbon material include natural graphite such as scale-shaped graphite, and artificial graphite obtained by graphitizing easily-graphitizable carbon such as pyrolytic carbon, mesocarbon microbeads (MCMB), or a carbon fiber at 2800° C. or higher.

Examples of the material containing Si as a constituent element include materials that electrochemically react with Li such as an Si element, an alloy of Si and an element other than the Si such as Co, Ni, Ti, Fe, or Mn, and an oxide of Si. Among them, a material containing Si and O as constituent elements, which is expressed as a general composition formula $SiO_x$ (where $0.5 \leq x \leq 1.5$), is suitably used. In the above examples of the material containing Si as a constituent element, the alloy of Si and the element other than the Si may be either a single solid solution or an alloy including a plurality of phases of an Si element phase and an Si alloy phase.

The $SiO_x$ is not limited only to the oxide of Si, but may include a microcrystalline phase of Si or an amorphous phase of Si. In this case, the atomic ratio of Si and O is determined by incorporating the microcrystalline phase of Si or the amorphous phase of Si. In other words, the material expressed as $SiO_x$ includes, e.g., a structure in which Si (e.g., microcrystalline Si) is dispersed in an amorphous $SiO_2$ matrix, and x of the atomic ratio, incorporating the amorphous $SiO_2$ and the Si dispersed in the amorphous $SiO_2$, may satisfy $0.5 \leq x \leq 1.5$. For example, when a material has a structure in which Si is dispersed in the amorphous $SiO_2$ matrix, and the molar ratio of $SiO_2$ and Si is 1:1, this material is represented by SiO because x=1 is established. In the case of the material having such a structure, a peak due to the presence of Si (microcrystalline Si) may not be observed, e.g., by X-ray diffraction analysis, but the presence of fine Si can be confirmed by transmission electron microscope (TEM) observation.

The binder and the conductive assistant may be the same as those used in the positive electrode, as described above.

The current collector may be, e.g., a metal foil, a punching metal, a mesh, or an expanded metal made of copper or the like. In general, a copper foil with a thickness of 10 to 30 μm can be suitably used.

The negative electrode has a current collector tab. The current collector tab is generally provided in the following manner. A part of the current collector remains exposed without forming the negative electrode material mixture layer when the negative electrode is produced, and thus this exposed portion can serve as the current collector tab. However, the current collector tab does not necessarily need to be integrated with the current collector from the beginning and may be provided by connecting a nickel foil or the like to the current collector afterward.

Non-Aqueous Electrolyte

The non-aqueous electrolyte may be a non-aqueous electrolytic solution in which a lithium salt is dissolved in an organic solvent. The lithium salt used for the non-aqueous electrolytic solution is not particularly limited as long as it dissociates in the solvent to produce a lithium ion and is not likely to cause a side reaction such as decomposition in the working voltage range of the battery. Examples of the lithium salt include inorganic lithium salts such as $LiClO_4$, $LiPF_6$, $LiBF_4$, $LiAsF_6$, and $LiSbF_6$, and organic lithium salts such as $LiCF_3SO_3$, $LiCF_3CO_2$, $Li_2C_2F_4(SO_3)_2$, $LiN(CF_3SO_2)_2$, $LiC(CF_3SO_2)_3$, $LiC_nF_{2n+1}SO_3$ ($2 \leq n \leq 7$), and $LiN(RfOSO_2)_2$ (where Rf represents a fluoroalkyl group).

The concentration of the lithium salt in the non-aqueous electrolytic solution is preferably 0.5 to 1.5 mol/L, and more preferably 0.9 to 1.25 mol/L.

The organic solvent used for the non-aqueous electrolytic solution is not particularly limited as long as it dissolves the lithium salt and does not cause a side reaction such as decomposition in the working voltage range of the battery Examples of the organic solvent include the following: cyclic carbonates such as ethylene carbonate, propylene carbonate, and butylene carbonate; chain carbonates such as dimethyl carbonate, diethyl carbonate, and methyl ethyl carbonate; chain esters such as methyl propionate; cyclic esters such as γ-butyrolactone; chain ethers such as dimethoxyethane, diethyl ether, 1,3-dioxolane, diglyme, triglyme, and tetraglyme; cyclic ethers such as dioxane, tetrahydrofuran, and 2-methyltetrahydrofuran; nitriles such as acetonitrile, propionitrile, and methoxypropionitrile; and sulfurous esters such as ethylene glycol sulfite. The organic solvent may be a mixture of two or more of these materials. A combination of the materials capable of achieving a high conductivity, e.g., a mixed solvent of the ethylene carbonate and the chain carbonate is preferred for better characteristics of the battery.

Separator

In the non-aqueous electrolyte secondary battery of the present invention, a separator is not generally required, since the insulating layer is formed on the material mixture layer of the electrode. However, a separator may be further provided between the positive electrode and the negative electrode. This configuration can prevent a short circuit between the positive electrode and the negative electrode more reliably.

The separator that is provided in addition to the insulating layer is preferably a polyurethane microporous film or a polyethylene terephthalate nonwoven fabric in terms of improving the mechanical strength of the battery and retaining the electrolytic solution.

Battery Form

The non-aqueous electrolyte secondary battery of the present invention may be cylindrical in shape (e.g., a rectangular or circular cylinder) and use an outer can made of steel, aluminum, or the like. The non-aqueous electrolyte secondary battery also may be a soft package battery using a metal-deposited laminated film as an outer package.

Embodiment 2

Next, a method for manufacturing a non-aqueous electrolyte secondary battery of the present invention will be described.

According to a first aspect of a method for manufacturing a non-aqueous electrolyte secondary battery of the present invention, the non-aqueous electrolyte secondary battery includes a positive electrode that includes a material mixture layer containing a positive electrode active material, a negative electrode that includes a material mixture layer containing a negative electrode active material, an insulating layer, and a non-aqueous electrolyte, and the method includes the following: preparing a composition for forming an insulating layer that includes oligomers and monomers that can be polymerized by energy ray irradiation, inorganic particles, a thermoplastic resin, and a solvent; applying the composition for forming an insulating layer to the material mixture layer of at least one electrode selected from the positive electrode and the negative electrode to form a coating; and forming a porous insulating layer on the material mixture layer by irradiating the coating with an energy ray to form a resin having a cross-linked structure while the coating is dried so as to remove the solvent. The solvent includes a low-boiling solvent having a boiling point of 50° C. or higher and lower than 170° C. and a polar parameter of 4.0 or more, and a high-boiling solvent having a boiling point of 170° C. or higher. A content of the high-boiling solvent in the composition for forming an insulating layer is 1 to 13 vol %. The composition for forming an insulating layer has a viscosity of 5 to 50 mPa·s.

According to a second aspect of a method for manufacturing a non-aqueous electrolyte secondary battery of the present invention, the non-aqueous electrolyte secondary battery includes a positive electrode that includes a material mixture layer containing a positive electrode active material, a negative electrode that includes a material mixture layer containing a negative electrode active material, an insulating layer, and a non-aqueous electrolyte, and the method includes the following: preparing a composition for forming an insulating layer that includes oligomers and monomers that can be polymerized by energy ray irradiation, inorganic particles, and a solvent; applying the composition for forming an insulating layer to the material mixture layer of at least one electrode selected from the positive electrode and the negative electrode to form a coating; forming a porous insulating layer on the material mixture layer by irradiating the coating with an energy ray to form a resin having a cross-linked structure while the coating is dried so as to remove the solvent; and forming a porous thermoplastic resin layer containing a thermoplastic resin on at least one of a surface of the insulating layer of the electrode that is provided with the insulating layer and a surface of the material mixture layer of the electrode that is not provided with the insulating layer. The solvent includes a low-boiling solvent having a boiling point of 50° C. or higher and lower than 170° C. and a polar parameter of 4.0 or more, and a high-boiling solvent having a boiling point of 170° C. or higher. A content of the high-boiling solvent in the composition for forming an insulating layer is 1 to 13 vol %. The composition for forming an insulating layer has a viscosity of 5 to 50 mPa·s.

With the above methods, the non-aqueous electrolyte secondary battery with excellent load characteristics and charge-discharge cycle characteristics can be manufactured. The manufacturing method of the first aspect can produce the non-aqueous electrolyte secondary battery of the first aspect of the present invention. The manufacturing method of the second aspect can produce the non-aqueous electrolyte secondary battery of the second aspect of the present invention.

The oligomers and monomers that can be polymerized by energy ray irradiation may be the same as those described in Embodiment 1. The resin having the cross-linked structure may be the resin (A) described in Embodiment 1. Moreover, the inorganic particles and the thermoplastic resin may be the inorganic particles (B) and the thermoplastic resin (C) described in Embodiment 1, respectively.

Examples of the low-boiling solvent having a boiling point of 50° C. or higher and lower than 170° C. and a polar parameter of 4.0 or more, preferably 4.5 or more include the following: methyl ethyl ketone (boiling point: about 79.6° C., polar parameter: 4.7); tetrahydrofuran; acetone; dioxane; ethyl acetate; chloroform; acetonitrile; pyridine; 1-propanol; ethanol; methanol; acetic acid; and water. The use of the low-boiling solvent with the above polar parameter can improve the dispersibility of the components of the composition for forming an insulating layer, particularly the dispersibility of the inorganic particles.

Examples of the high-boiling solvent having a boiling point of 170° C. or higher include the following: ethylene glycol (boiling point: about 197.9° C.); 1,2-propanediol; dimethyl sulfoxide; N,N-dimethylaniline; N-methylpyrrolidone; benzyl alcohol; cresol; formamide; nitrobenzene; and diethylene glycol.

Each of the low-boiling solvent and the high-boiling solvent may be a mixture of two or more of the above examples. In the present specification, the boiling point and the polar parameter of the solvents used are values described in the solvent guide or the solvent handbook.

The porosity of the insulating layer can be improved by using both the low-boiling solvent and the high-boiling solvent as the solvent of the composition for forming an insulating layer. The content of the high-boiling solvent in the composition for forming an insulating layer is in the range of 1 to 13 vol %. If the content of the high-boiling solvent is too low, the porosity of the insulating layer is reduced. If the content of the high-boiling solvent is too high, the content of the low-boiling solvent is relatively reduced, and thus the dispersibility of the components of the composition for forming an insulating layer is reduced.

When the coating that has been formed by the application of the composition for forming an insulating layer is irradiated with the energy ray to form the resin having the cross-linked structure while the coating is dried so as to remove the solvent, a mixed layer that includes components of the insulating layer and components of the material mixture layer can be formed at the interface between the insulating layer and the material mixture layer. This can improve the bonding strength between the insylating layer and the electrode.

A polymerization initiator, the cross-linking agents as described in Embodiment 1, or the like may be added to the composition for forming an insulating layer.

Examples of the polymerization initiator include the following: bis(2,4,6-trimethylbenzoyl)-phenylphosphine oxide, 2,2-dimethoxy-2-phenylacetophenone, and 2-hydroxy-2-methylpropiophenone. The amount of the polymerization initiator used is preferably 1 to 10 parts by mass with respect to 100 parts by mass of the total amount of the oligomers and the monomers.

The viscosity of the composition for forming an insulating layer should be 5 to 50 mPa·s. When the viscosity falls within the above range, the mixed layer is formed at the interface between the insulating layer and the material mixture layer, so that the adhesive strength between the insulating layer and the material mixture layer can be improved. Moreover, the porosity of the insulating layer can be set in an appropriate range.

The method for applying the composition for forming an insulating layer to the material mixture layer of the electrode is not particularly limited, and various application methods can be used. The typical application methods are as follows. In the case of a laminated-type battery, a punched electrode is immersed in the composition for forming an insulating layer by a dip coater or the like so that a coating can be provided on both sides of the electrode. In the case of a wound-type battery, a continuous roll-to-roll coater is used, and the composition for forming an insulating layer can be successively applied to the surface of the electrode with a knife coater or the like. In the formation of the mixed layer, the low viscosity composition for forming an insulating layer and a dip coater are preferably used. However, a favorable mixed layer also can be formed in such a manner that after the material mixture layer of the electrode is applied and before the material mixture layer is completely dried, the composition for forming an insulating layer is successively applied to the wet material mixture layer.

The energy ray with which the coating is irradiated may be, e.g., visible light, an ultraviolet ray, radiation, or an electron beam. The visible light or the ultraviolet ray is more preferred because of their higher level of safety.

For the energy ray irradiation, it is preferable that the wavelength, the irradiation strength, the irradiation time, etc. are appropriately adjusted so as to form the resin (A) successfully. Specifically, e.g., the energy ray may have a wavelength of 320 to 390 nm and an irradiation strength of 120 to 180 mW/cm$^2$. The integrated irradiance is preferably 200 to 600 mJ/cm$^2$.

The drying conditions (temperature, time, and drying method) may be appropriately selected in accordance with the type of the solvent used in the composition for forming an insulating layer so as to be able to remove the solvent properly. Specifically, e.g., the drying temperature may be 20 to 80° C., and the drying time may be 30 minutes to 24 hours. Moreover, drying method may be air drying or any method using a thermostatic bath, a dryer, a hot plate, or the like.

It is preferable that the electrode having the insulating layer formed in the above manner is further calendered to make the surface smooth. Thus, the surface roughness Ra of the insulating layer can be set to 0.2 to 0.4 µm.

The electrode formed in the above manner can further include the insulating resin layer, which has been described in Embodiment 1. The insulating resin layer can be formed in such a manner that the resin having the electrical insulation (as described in Embodiment 1) is applied to the end portion of the electrode by a predetermined method, and then cured and dried by a predetermined method.

The method for forming the thermoplastic resin layer of the second aspect is not particularly limited, and a composition for forming a thermoplastic resin layer in which the thermoplastic resin (C) is dissolved in a suitable solvent may be applied to the surface of the electrode, and then dried.

Hereinafter, the present invention will be described by way of examples.

EXAMPLE 1

Preparation of Composition for Forming Insulating Layer

The following materials were placed in a container at the following ratios, and then stirred for 12 hours to prepare a mixed solution.

(1) Boehmite (inorganic particles, average particle size: 0.6 µm): 21.10 parts by mass (2) Polyethylene fine particles (thermoplastic resin particles, melting point: 120° C.): 3.54 parts by mass (3) Urethane acrylate (polymerizable oligomer, "EBE-CRYL 8405" manufactured by DAICEL-CYTEC Company Ltd.): 6.26 parts by mass (4) Tripropylene glycol diacrylate (polymerizable monomer): 1.56 parts by mass (5) Methyl ethyl ketone (low-boiling solvent, boiling point: about 79.6° C., polar parameter: 4.7): 48.46 parts by mass (6) Water: 14.16 parts by mass (7) Ethylene glycol (high-boiling solvent, boiling point: about 197.9° C.): 4.69 parts by mass (8) Zirconia beads (diameter: 1.5 mm): 50% of the volume of a coating material Next, as a polymerization initiator, 0.23 parts by mass of 2,4,6-trimethylbenzoyl-diphenyl-phosphine oxide (TPO) was added to the mixed solution and stirred for about 1 hour. Moreover, this mixed solution was diluted with the addition of methyl ethyl ketone so that the viscosity of the mixed solution was reduced to about 10 mPa·s. Then, the zirconia beads were separated, thereby providing a composition for forming an insulating layer. The content of the ethylene glycol (high-boiling solvent) in the resultant composition was 2.40 vol %.

Production of Negative Electrode

A water-based negative electrode material mixture containing paste was prepared by mixing 97 parts by mass of graphite (negative electrode active material) and 1 part by mass of GMC and 2 parts by mass of SBR (which were binders) by using ion-exchanged water having a specific electric conductivity of 2.0×10$^5$ Ω/cm or more as a solvent. This paste was applied to a copper foil (negative electrode current collector) having a thickness of 10 µm, which then was dried and calendered, so that a negative electrode material mixture layer was formed on both sides of the copper foil. When the negative electrode material mixture containing paste was applied to the copper foil, a portion of the copper foil was left uncoated and exposed. The thickness of the negative electrode material mixture layer was 66 µm per one side of the current collector (copper foil). Subsequently, the negative electrode material mixture layer was cut so as to contain the exposed portion of the copper foil. Moreover, a nickel current collector tab for drawing a current was welded to the exposed portion, and thus a negative electrode was produced.

Production of Integrated Component of Negative Electrode and Insulating Layer

Next, using a dip coater, the negative electrode was immersed in the composition for forming an insulating layer at a rate of 15 mm/sec, held at the lowest point for about 1 sec, and then raised at a rate of 10 mm/sec. Thus, the composition for forming an insulating layer was applied to both sides of the negative electrode. In this case, to maintain the liquid level of the dip coater constant, the composition for forming an insulating layer was circulated at a flow rate of 2 L/min by a flow system.

Then, the negative electrode was suspended from a lifting device including an air cylinder, and irradiated with an ultraviolet ray having a wavelength of 365 nm at an irradiance of 150 mW/cm$^2$ for 3 seconds from both sides of the negative electrode while a hot air of 60° C. was blowing at an air flow rate of 0.5 msec, so that curing and drying were performed simultaneously. Thus, an insulating layer with a thickness of about 15 μm was formed on each of the material mixture layers provided on both sides of the negative electrode.

Production of Positive Electrode

A positive electrode material mixture containing paste was prepared by mixing 20 parts by mass of $LiNi_{0.5}Co_{0.2}Mn_{0.3}O_2$ and 80 parts by mass of $LiCoO_2$ (which were positive electrode active materials), 7 parts by mass of acetylene black (conductive assistant), and 3 parts by mass of PVDF (binder) uniformly by using NMP as a solvent. This paste was applied to one side of an aluminum foil (positive electrode current collector) having a thickness of 15 μm, which then was dried and calendered, so that a positive electrode material mixture layer was formed. When the positive electrode material mixture containing paste was applied to the aluminum foil, a portion of the aluminum foil was left uncoated and exposed. The thickness of the positive electrode material mixture layer was 70 μm per one side of the current collector (aluminum foil). Subsequently, the positive electrode material mixture layer was cut so as to contain the exposed portion of the aluminum foil. Moreover, an aluminum current collector tab for drawing a current was welded to the exposed portion, and thus a positive electrode was produced.

Assembly of Battery

The positive electrode was disposed on both sides of the integrated component of the negative electrode and the insulating layer to form a laminated electrode body. The laminated electrode body was inserted into an outer package made of an aluminum laminated film. Subsequently, a non-aqueous electrolytic solution (obtained by dissolving $LiPF_6$ at a concentration of 1.2 mol/L in a mixed solvent containing an ethylene carbonate and an ethyl methyl carbonate at a volume ratio of 1:2) was injected into the outer package. Then, the outer package was sealed, providing a laminated-type non-aqueous electrolyte secondary battery.

Figure 7:
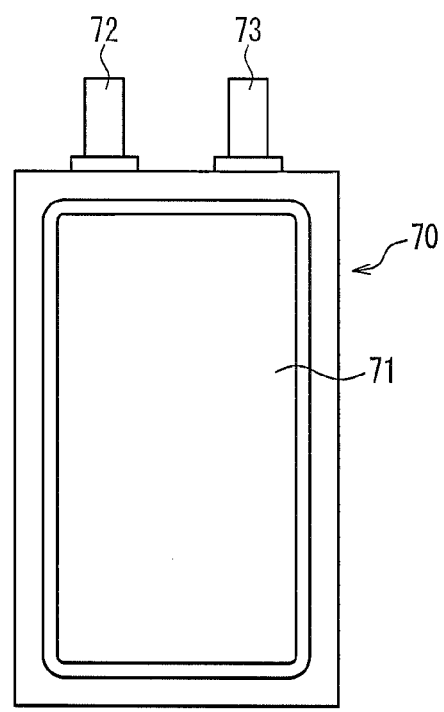
FIG. 7 is a plan view showing an example of a non-aqueous electrolyte secondary battery of the present invention.

FIG. 7 is a plan view showing the battery thus produced. In FIG. 7 the non-aqueous electrolyte secondary battery 70 of this example is configured so that the laminated electrode body and the non-aqueous electrolytic solution are housed in the outer package 71 that is made of an aluminum laminated film and is rectangular in shape when seen in a plan view. Moreover, a positive electrode external terminal 72 and a negative electrode external terminal 73 are drawn from the same side of the outer package 71. Although not shown in FIG. 7, each of the aluminum current collector tabs of the positive electrodes provided on both sides of the negative electrode was connected to the positive electrode external terminal 72 in the outer package 71.

EXAMPLE 2

A battery was produced in the same manner as Example 1 except that a water dispersion (i.e., a composition for forming a thermoplastic resin layer) including 20 mass % of polyethylene fine particles with an average particle size of 1.0 μm was applied to the material mixture layer of the positive electrode of Example 1 using a die coater, and then dried with a hot air of 60° C., thereby forming a thermoplastic resin layer with a thickness of 5 μm.

EXAMPLE 3

A battery was produced in the same manner as Example 1 except that the composition for forming a thermoplastic resin layer of Example 2 was applied to the insulating layers on both sides of the integrated component of the negative electrode and the insulating layer of Example 1 using a dip coater, and then dried with a hot air of 60° C., thereby forming thermoplastic resin layers, each having a thickness of 5 μm.

EXAMPLE 4

A battery was produced in the same manner as Example 1 except that the composition for forming an insulating layer of Example 1 was used to form an insulating layer with a thickness of 15 μm on the material mixture layer of the positive electrode of Example 1, and an insulating layer was not formed on the material mixture layers of the negative electrode.

EXAMPLE 5

A battery was produced in the same manner as Example 1 except that 3 parts by mass of SiO and 94 parts by mass of graphite were used as negative electrode active materials, and the thickness of the negative electrode material mixture layer was 63 μm per one side.

EXAMPLE 6

A battery was produced in the same manner as Example 2 except that 3 parts by mass of SiO and 94 parts by mass of graphite were used as negative electrode active materials, and the thickness of the negative electrode material mixture layer was 63 μm per one side.

EXAMPLE 7

A battery was produced in the same manner as Example 3 except that 3 parts by mass of SiO and 94 parts by mass of graphite were used as negative electrode active materials, and the thickness of the negative electrode material mixture layer was 63 μm per one side.

EXAMPLE 8

A battery was produced in the same manner as Example 1 except that a polyurethane microporous film was disposed between the positive electrode and the integrated component of the negative electrode and the insulating layer.

EXAMPLE 9

Preparation of Composition for Forming Insulating Layer

The following materials were placed in a container at the following ratios, and then stirred for 12 hours to prepare a mixed solution.

(1) Boehmite (inorganic particles, average particle size: 0.6 μm): 25.64 parts by mass (2) Urethane acrylate (polymerizable oligomer, "EBECRYL 8405" manufactured by DAICEL-CYTEC Company Ltd.): 7.60 parts by mass (3) Tripropylene glycol diacrylate (polymerizable monomer): 1.90 parts by mass (4) Methyl ethyl ketone (low-boiling solvent, boiling point: about 79.6° C., polar parameter: 4.7): 58.88 parts by mass (5) Ethylene glycol (high-boiling solvent, boiling point: about 197.9° C.): 5.70 parts by mass (6) Zirconia beads (diameter: 1.5 mm): 50% of the volume of a coating material Next, as a polymerization initiator, 0.28 parts by mass of TPO was added to the mixed solution and stirred for about 1 hour. Moreover, this mixed solution was diluted with the addition of methyl ethyl ketone so that the viscosity of the mixed solution was reduced to about 10 mPa·s. Then, the zirconia beads were separated, thereby providing a composition for forming an insulating layer. The content of the ethylene glycol (high-boiling solvent) in the resultant composition was 2.67 vol %.

An integrated component of the negative electrode and the insulating layer was produced in the same manner as Example 1 except that the above composition for forming an insulating layer was used. A thermoplastic resin layer with a thickness of 5 μm was formed on the material mixture layer of the positive electrode of Example 1 in the same manner as Example 2.

A battery was produced in the same manner as Example 1 except that the above integrated component of the negative electrode and the insulating layer and the above positive electrode were used.

EXAMPLE 10

A battery was produced in the same manner as Example 1 except that both sides of the integrated component of the negative electrode and the insulating layer of Example 1 were further calendered. The applied pressure in the calendaring process was 8 kg/cm$^2$.

EXAMPLE 11

Preparation of Composition for Forming Insulating Resin Layer

The following materials were placed in a container at the following ratios, and then stirred to prepare a mixed solution. Subsequently, methyl ethyl ketone was further added to the mixed solution so that the viscosity was suitably adjusted to obtain a desired coating thickness during the application process, and thus a composition for forming an insulating resin layer was provided.

(1) Urethane acrylate (polymerizable oligomer, "EBE-CRYL 8405" manufactured by DAICEL-CYTEC Company Ltd.): 19.37 parts by mass (2) Tripropylene glycol diacrylate (polymerizable monomer): 4.84 parts by mass (3) Methyl ethyl ketone: 75.08 parts by mass (4) TPO (polymerization initiator): 0.71 parts by mass Next, the composition for forming an insulating resin layer was applied to the upper end portion of the integrated component of the negative electrode and the insulating layer of Example 1, and then irradiated with an ultraviolet ray having a wavelength of 365 nm at an irradiance of 150 mW/cm$^2$ for 3 seconds while a hot air of 60° C. was blowing at an air flow rate of 0.5 m/sec, so that curing and drying were performed simultaneously. Consequently, as shown in FIG. 4A, a rectangular insulating resin layer was formed on the upper end portion of the integrated component of the negative electrode and the insulating layer. The insulating resin layer had a width of 2.0 mm from the end portion of the integrated component of the negative electrode and the insulating layer, a length that was 1.0 mm longer than the width of the current collector tab, and a thickness of 10 μm. Moreover, the positive electrode of Example 1 was disposed on both sides of the integrated component of the negative electrode and the insulating layer to form a laminated electrode body. Then, a battery was produced in the same manner as Example 1 except that this laminated electrode body was used.

EXAMPLE 12

A battery was produced in the same manner as Example 1 except that the composition for forming an insulating layer did not include polyethylene fine particles.

EXAMPLE 13

A battery was produced in the same manner as Example 9 except that a thermoplastic resin layer was not formed on the material mixture layer of the positive electrode.

COMPARATIVE EXAMPLE 1

A battery was produced in the same manner as Example 1 except that the composition for forming an insulating layer did not include inorganic particles.

COMPARATIVE EXAMPLE 2

Preparation of Composition for Forming Insulating Layer

The following materials were placed in a container at the following ratios, and then stirred for 12 hours to prepare a mixed solution.

(1) Boehmite (inorganic particles, average particle size: 0.6 μm): 22.93 parts by mass (2) Polyethylene fine particles (thermoplastic resin particles, melting point: 120° C.): 3.85 parts by mass (3) Urethane acrylate (polymerizable oligomer, "EBE-CRYL 8405" manufactured by DAICEL-CYTEC Company Ltd.): 6.80 parts by mass (4) Tripropylene glycol diacrylate (polymerizable monomer): 1.70 part by mass (5) Methyl ethyl ketone (low-boiling solvent, boiling point: about 79.6° C., polar parameter: 4.7): 44.00 parts by mass (6) Water: 15.38 parts by mass (7) Ethylene glycol (high-boiling solvent, boiling point: about 197.9° C.): 5.10 parts by mass (8) Zirconia beads (diameter: 1.5 mm): 50% of the volume of a coating material Next, as a polymerization initiator, 0.25 parts by mass of TPO was added to the mixed solution and stirred for about 1 hour. Then, the zirconia beads were separated by pressure filtration, thereby providing a composition for forming an insulating layer. The composition for forming an insulating layer had a viscosity of about 600 mPa·s. The content of the ethylene glycol (high-boiling solvent) in the resultant composition was 4.87 vol %.

Next, using a bar coater, the composition for forming an insulating layer was applied to both sides of the negative electrode of Example 1, and irradiated with an ultraviolet ray having a wavelength of 365 nm at an irradiance of 150 mW/cm$^2$ for 3 seconds while a hot air of 60° C. was blowing at an air flow rate of 0.5 m/sec, so that curing and drying were performed simultaneously. Thus, an insulating layer with a thickness of 15 μm was formed on each of the material mixture layers provided on both sides of the negative electrode. Then, a battery was produced in the same manner as Example 1 except that the above integrated component of the negative electrode and the insulating layer was used.

COMPARATIVE EXAMPLE 3

A battery was produced in the same manner as Example 9 except that an insulating layer was not formed on the material mixture layers provided on both sides of the negative electrode.

COMPARATIVE EXAMPLE 4

Preparation of Composition for Forming Insulating Layer

The following materials were placed in a container at the following ratios, and then stirred for 12 hours to prepare a mixed solution.
(1) Boehmite (inorganic particles, average particle size: 0.6 μm): 28.39 parts by mass
(2) Urethane acrylate (polymerizable oligomer, "EBECRYL 8405" manufactured by DAICEL-CYTEC Company Ltd.): 8.41 parts by mass
(3) Tripropylene glycol diacrylate (polymerizable monomer): 2.10 parts by mass
(4) Methyl ethyl ketone (low-boiling solvent, boiling point: about 79.6° C., polar parameter: 4.7): 54.47 parts by mass
(5) Ethylene glycol (high-boiling solvent, boiling point: about 197.9° C.): 6.31 parts by mass
(6) Zirconia beads (diameter: 1.5 mm): 50% of the volume of a coating material Next, as a polymerization initiator, 0.31 parts by mass of TPO was added to the mixed solution and stirred for about 1 hour. Then, the zirconia beads were separated by pressure filtration, thereby providing a composition for forming an insulating layer. The composition for forming an insulating layer had a viscosity of about 700 mPa·s. The content of the ethylene glycol (high-boiling solvent) in the resultant composition was 6.13 vol %.

Next, using a bar coater, the composition for forming an insulating layer was applied to both sides of the negative electrode of Example 1, and irradiated with an ultraviolet ray having a wavelength of 365 nm at an irradiance of 150 mW/cm$^2$ for 3 seconds while a hot air of 60° C. was blowing at an air flow rate of 0.5 m/sec, so that curing and drying were performed simultaneously. Thus, an insulating layer with a thickness of 15 μm was formed on each of the material mixture layers provided on both sides of the negative electrode. Then, a battery was produced in the same manner as Example 9 except that the above integrated component of the negative electrode and the insulating layer was used.

COMPARATIVE EXAMPLE 5

A battery was produced in the same manner as Example 1 except that after the composition for forming an insulating layer was applied to both sides of the negative electrode using a dip coater in Example 1, the coatings were dried at 60° C. for about 10 minutes, and subsequently irradiated with an ultraviolet ray having a wavelength of 365 nm at an irradiance of 150 mW/cm$^2$ for 3 seconds, so that an insulating layer with a thickness of 15 μm was formed on each of the material mixture layers provided on both sides of the negative electrode.

COMPARATIVE EXAMPLE 6

A composition for forming an insulating layer was prepared in the same manner as Example 1 except that the ethylene glycol was not used, but replaced by methyl ethyl ketone in an amount equal to that of the ethylene glycol. Then, a battery was produced in the same manner as Example 1 except that the above composition for forming an insulating layer was used.

COMPARATIVE EXAMPLE 7

Preparation of Composition for Forming Insulating Layer

The following materials were placed in a container at the following ratios, and then stirred for 12 hours to prepare a mixed solution.
(1) Boehmite (inorganic particles, average particle size: 0.6 μm): 18.88 parts by mass
(2) Polyethylene fine particles (thermoplastic resin particles, melting point: 120° C.): 3.17 parts by mass
(3) Urethane acrylate (polymerizable oligomer, "EBECRYL 8405" manufactured by DAICEL-CYTEC Company Ltd.): 5.60 parts by mass
(4) Tripropylene glycol diacrylate (polymerizable monomer): 1.40 parts by mass
(5) Methyl ethyl ketone (low-boiling solvent, boiling point: about 79.6° C., polar parameter: 4.7): 43.37 parts by mass
(6) Water: 12.66 parts by mass
(7) Ethylene glycol (high-boiling solvent, boiling point: about 197.9° C.): 14.72 parts by mass
(8) Zirconia beads (diameter: 1.5 mm): 50% of the volume of a coating material Next, as a polymerization initiator, 0.21 parts by mass of TPO was added to the mixed solution and stirred for about 1 hour. Moreover, this mixed solution was diluted with the addition of methyl ethyl ketone so that the viscosity of the mixed solution was reduced to about 10 mPa·s. Then, the zirconia beads were separated, thereby providing a composition for forming an insulating layer. The content of the ethylene glycol (high-boiling solvent) in the resultant composition was 13.81 vol %. Then, a battery was produced in the same manner as Example 1 except that the above composition for forming an insulating layer was used.

COMPARATIVE EXAMPLE 8

A composition for forming an insulating layer was prepared in the same manner as Example 1 except that the methyl ethyl ketone was not used, but replaced by toluene (boiling point: about 110.6° C., polar parameter: 2.4) in an amount equal to that of the methyl ethyl ketone. Then, a battery was produced in the same manner as Example 1 except that the above composition for forming an insulating layer was used.

Each of the following evaluation tests was performed on the non-aqueous electrolyte secondary batteries of Examples 1 to 13 and Comparative Examples 1 to 8.

Short Circuit Test

Each of the batteries produced was sandwiched between two glass plates in the vertical direction, and a silicone rubber plate was inserted between the battery and each of the glass plates so as to bring them into close contact with one another. In this state, pressure was applied to the battery using a jig. Then, under a load of 2.2 N/cm$^2$, a constant-current and constant-voltage charge was performed on the battery until the voltage reached 4.2 V. Comparing the initial open-circuit voltage with the open-circuit voltage after 1 hour, the short circuit properties were evaluated from the presence or absence of a voltage reduction.

Load Characteristics Test

In each of the batteries, a constant-current charge was performed at a current value of 0.2 C until the voltage reached 4.2 V, and subsequently a constant-voltage charge was performed at 4.2 V. The total charge time from the start of the constant-current charge to the end of the constant-voltage charge was 10 hours. Then, a constant-current discharge was performed at a current value of 0.2 C until the voltage was reduced to 2.5 V, and the discharge capacity (0.2 C discharge capacity) was measured. Next, a constant-current and constant-voltage charge was performed on each of the batteries under the same conditions as described above. Then, a constant-current discharge was performed at a current value of 2 C until the voltage was reduced to 2.5 V, and the discharge capacity (2 C discharge capacity) was measured.

Based on the above results, the 2 C discharge capacity was divided by the 0.2 C discharge capacity of each of the batteries, and the resultant value was expressed as a percentage to determine a load capacity maintenance ratio of each of the batteries. The higher the load capacity maintenance ratio is, the better the load characteristics of the battery are.

Charge-Discharge Cycle Characteristics Test

In each of the batteries that were different from those used for the above load characteristics test, a constant-current charge was performed at a current value of 1 C until the voltage reached 4.2 V, and subsequently a constant-voltage charge was performed at 4.2 V. The total charge time from the start of the constant-current charge to the end of the constant-voltage charge was 3 hours. Then, a constant-current discharge was performed on each of the charged batteries at a current value of 1 C until the voltage was reduced to 2.5 V. Defining this series of operations as a cycle, each of the batteries was repeatedly charged and discharged in 300 cycles. The discharge capacity of the 300th cycle was divided by the discharge capacity of the 1st cycle, and the resultant value was expressed as a percentage to determine a cycle capacity maintenance ratio of each of the batteries. The higher the cycle capacity maintenance ratio is, the better the charge-discharge cycle characteristics of the battery are.

Adhesive Property Test

After forming the insulating layer on the electrode, the insulating layer was further irradiated with an ultraviolet ray at an irradiance of 150 mW/cm$^2$ for 20 seconds, and thus a load was imposed on the insulating layer. Then, the edge face of the electrode was visually observed to decide whether peeling occurred at the interface between the electrode material mixture layer and the insulating layer. If the adhesion was maintained, no peeling was considered to occur, and the battery was rated A. If interfacial peeling was observed, peeling was considered to occur, and the battery was rated B.

Elevated Temperature Test

A test battery was placed in a thermostatic bath, and the temperature was raised from 30° C. to 160° C. at a rate of 1° C. per minute to measure changes in the internal resistance of the battery. The battery temperature was measured by attaching a thermocouple thermometer to the surface of the battery. The internal resistance of the battery was measured every second using a resistance meter "Hi TESTER" manufactured by HIOKI E. E. CORPORATION while the temperature was raised. In the temperature range of 100 to 150° C., shutdown was considered to occur when the maximum value of the internal resistance of the battery was increased to at least 20 times larger than the internal resistance at 30° C.

The non-aqueous electrolyte secondary batteries of Examples 1 to 13 and Comparative Examples 2 and 4 to 8 were evaluated as follows.

Confirmation of Presence or Absence of Mixed Layer

The presence or absence of a mixed layer was confirmed by observing the cross sections of the insulating layer and the material mixture layer of the electrode used in each of the batteries with a scanning electron microscope.

Measurement of Surface Roughness Ra

The surface roughness Ra of the insulating layer of the electrode used in each of the batteries was measured. Specifically, using a scanning white-light interferometer "NewView 5030" manufactured by Zygo Corporation, the surface of the insulating layer was measured at five points in an area of 0.36 mm×0.27 mm. Then, image analysis was performed on each of the points to determine the surface roughness, and the average of those values of the surface roughness was calculated as the surface roughness Ra.

Peel Strength Test

Figure 8:
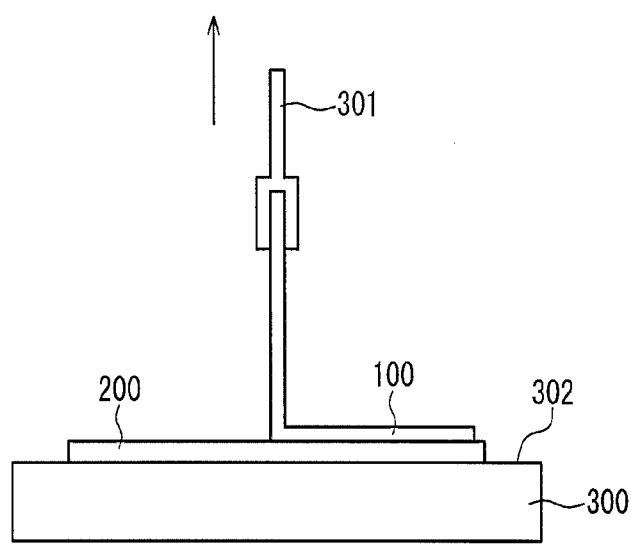
FIG. 8 is a side view showing the schematic configuration of a 90° peeling tester.

The peel strength of the electrode used in each of the batteries was measured using a 90° peeling tester "TE-3001" manufactured by TESTER SANGYO CO., LTD. in the following manner. FIG. 8 shows the schematic configuration of the 90° peeling tester. The 90° peeling tester includes a stand 300 having a sample supporting surface 302, a double-sided tape 200 for attaching a sample 100 to the sample supporting surface 302, and a jig 301 for peeling off the sample 100 that has been stuck to the sample supporting surface 302. For the peel strength measurement, first, a strip of 10 cm length and 1 cm width was cut from the electrode and identified as the sample 100. Then, as shown in FIG. 8, one side of the double-sided tape ("NICETACK NW-15" manufactured by NICBIBAN CO., LTD.) 200 was attached to the surface of the sample 100 provided with the insulating layer, and the other side of the double-sided tape 200 was attached to the sample supporting surface 302. Subsequently, the end of the sample 100 was held by the jig 301 and pulled at 90 degrees from the sample supporting surface 302 at a peeling rate of 50 mm/min in the longitudinal direction (i.e., the direction indicated by the arrow in FIG. 8), and the strength was measured. This measurement was performed three times for each of the different electrodes, and the average of the measured values was calculated as the peel strength (gf).

Tables 1 and 2 show the above results.

TABLE 1

|  | Presence or absence of short circuit | Load capacity maintenance ratio (%) | Cycle capacity maintenance ratio (%) | Adhesive properties | Rise in resistance (times) | Presence or absence of mixed layer |
|---|---|---|---|---|---|---|
| Ex. 1 | not occur | 90 | 77 | A | 22 | formed |
| Ex. 2 | not occur | 85 | 75 | A | 50 | formed |
| Ex. 3 | not occur | 87 | 76 | A | 45 | formed |
| Ex. 4 | not occur | 82 | 74 | A | 25 | formed |
| Ex. 5 | not occur | 93 | 76 | A | 23 | formed |
| Ex. 6 | not occur | 88 | 75 | A | 50 | formed |
| Ex. 7 | not occur | 86 | 74 | A | 45 | formed |
| Ex. 8 | not occur | 82 | 73 | A | 21 | formed |
| Ex. 9 | not occur | 85 | 75 | A | 40 | formed |
| Ex. 10 | not occur | 91 | 77 | A | 23 | formed |
| Ex. 11 | not occur | 89 | 76 | A | 21 | formed |
| Ex. 12 | not occur | 90 | 76 | A | no rise | formed |
| Ex. 13 | not occur | 87 | 73 | A | no rise | formed |
| Comp. Ex. 1 | The battery was not evaluated due to extremely high resistance. | | | | | |
| Comp. Ex. 2 | not occur | 90 | 60 | B | 22 | not formed |
| Comp. Ex. 3 | The battery was short-circuited, and other evaluations were not conducted. | | | | | |
| Comp. Ex. 4 | not occur | 83 | 61 | B | 38 | not formed |
| Comp. Ex. 5 | slight short circuit | 84 | 76 | A | 17 | formed |
| Comp. Ex. 6 | not occur | 55 | 45 | A | 16 | formed |
| Comp. Ex. 7 | slight short circuit | 75 | The test was interrupted by short circuit in 35 cycles. | A | 21 | formed |
| Comp. Ex. 8 | slight short circuit | 70 | The test was interrupted by short circuit in 85 cycles. | A | 22 | formed |

TABLE 2

|  | Surface roughness Ra (μm) | Peel strength (gf) |
|---|---|---|
| Ex. 1 | 0.45 | 2.1 |
| Ex. 2 | 0.45 | 2.1 |
| Ex. 3 | 0.41 | 2.5 |
| Ex. 4 | 0.43 | 2.2 |
| Ex. 5 | 0.45 | 2.1 |
| Ex. 6 | 0.45 | 2.1 |
| Ex. 7 | 0.41 | 2.5 |
| Ex. 8 | 0.45 | 2.1 |
| Ex. 9 | 0.46 | 2.0 |
| Ex. 10 | 0.30 | 4.5 |
| Ex. 11 | 0.45 | 2.0 |
| Ex. 12 | 0.44 | 2.1 |
| Ex. 13 | 0.46 | 2.0 |
| Comp. Ex. 1 | — | — |
| Comp. Ex. 2 | 0.47 | 1.2 |
| Comp. Ex. 3 | — | — |
| Comp. Ex. 4 | 0.46 | 1.3 |
| Comp. Ex. 5 | 0.50 | 2.0 |
| Comp. Ex. 6 | 0.42 | 2.2 |
| Comp. Ex. 7 | 0.48 | 2.1 |
| Comp. Ex. 8 | 0.47 | 2.2 |

It is evident from Table 1 that the non-aqueous electrolyte secondary batteries of Examples 1 to 11 of the present invention obtained good results of all of the short circuit test, the load characteristics, the charge-discharge cycle characteristics, the adhesive properties, and the shutdown characteristics.

In Examples 1, 5, and 10, the batteries have good load characteristics and charge-discharge cycle characteristics, and the insulating layers also have good shutdown characteristics because a rise in resistance is 20 times or more of the initial value in the elevated temperature test. As can be seen from the results of Examples 2 to 3 and Examples 6 to 7, the addition of the thermoplastic resin layer containing the thermoplastic resin can further improve the shutdown characteristics. Although the insulating layer can achieve the effect even if it is formed on the positive electrode side, as shown in Example 4, better load characteristics can be obtained by forming the insulating layer on the negative electrode side. The negative electrode that includes SiO and corresponds to high capacity expands more greatly than general graphite when the battery is charged. Therefore, the expansion and shrinkage of the negative electrode is increased during charge and discharge. However, even in the case of such a negative electrode material mixture layer, Examples 5 to 7 demonstrate that the insulating layer of the present invention is effective for the expansion and shrinkage of the negative electrode. Example 8 demonstrates that the use of the film having an appropriate amount of pores for a further improvement in the performance of short circuit resistance does not interfere with the effects of the present invention. Example 9 demonstrates that even if the insulating layer does not contain the thermoplastic resin, the effects of the present invention can be achieved by the formation of the thermoplastic resin layer containing the thermoplastic resin.

In Example 10 using the calendered negative electrode, the surface roughness Ra of the insulating layer is lower than 0.40 μm, and thus the peel strength is improved. Example 11 demonstrates that the formation of the insulating resin layer on the upper end portion of the negative electrode also does not interfere with the effects of the present invention. On the other hand, Example 12 and Example 13, in which the thermoplastic resin is not added to the insulating layer and the electrode is not provided with the thermoplastic resin layer, demonstrate that the shutdown characteristics are reduced, but the other characteristics are excellent.

On the other hand, in Comparative Example 1, since the insulating layer does not contain the inorganic particles, the formation of pores in the insulating layer is insufficient, so that the battery cannot be evaluated due to extremely high resistance. In Comparative Examples 2 and 4, the mixed layer is not formed because the viscosity of the composition for forming an insulating layer is too high. Therefore, the adhesion between the insulating layer and the material mixture layer is poor, and the layers peel off easily, making it difficult to provide the electrode. In Comparative Example 3, the function of the separator is insufficient due to the absence of the insulating layer, so that the battery is short-circuited immediately and cannot be evaluated. In Comparative Example 5, although hot-air drying is sufficiently performed before curing of the insulating layer, the coating has coarse pores, which results in a short circuit. In Comparative Example 6, the use of the low-boiling solvent alone excessively increases the dispersibility of the components of the composition for forming an insulating layer, and thus causes clogging of the pores with particles. In addition, since the high-boiling solvent serving as a pore-forming material is not used, there are no pores, and both the load characteristics and the charge-discharge cycle characteristics are impaired. Comparative Example 7 has an extremely high content of the high-boiling solvent (ethylene glycol), and Comparative Example 8 uses the low-boiling solvent (toluene) with a small polar parameter. Therefore, in Comparative Examples 7 and 8, the inorganic particles or the like are not properly dispersed, but tend to be aggregated. Accordingly, the pore diameter is increased, and a short circuit is likely to occur. Moreover, the formation of pores is insufficient, and the load characteristics become worse.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes that come within the meaning and range of equivalency of the claims are intended to be embraced therein.

What is claimed is:

1. An electrode for a non-aqueous electrolyte secondary battery comprising:
    a material mixture layer containing an active material; and
    a porous insulating layer,
    wherein the insulating layer is formed on the material mixture layer,
    the insulating layer contains a resin having a cross-linked structure and inorganic particles,
    a mixed layer that includes components of the insulating layer and components of the material mixture layer is provided at an interface between the insulating layer and the material mixture layer, and
    the mixed layer has a thickness of 3 to 15 μm.

2. The electrode for a non-aqueous electrolyte secondary battery according to claim 1, wherein the insulating layer has a surface roughness Ra of 0.2 to 0.4 μm.

3. The electrode for a non-aqueous electrolyte secondary battery according to claim 1, wherein the insulating layer has a thickness of 3 to 50 μm.

4. The electrode for a non-aqueous electrolyte secondary battery according to claim 1, wherein in the insulating layer, a content of the resin having the cross-linked structure is 35 to 75 vol %, and a content of the inorganic particles is 25 to 65 vol %.

5. The electrode for a non-aqueous electrolyte secondary battery according to claim 1, wherein an insulating resin layer is further provided on at least a part of an end portion of the electrode.

6. The electrode for a non-aqueous electrolyte secondary battery according to claim 5, wherein the insulating resin layer is disposed at a position corresponding to a current collector tab of a counter electrode or a self-electrode.

7. The electrode for a non-aqueous electrolyte secondary battery according to claim 1, wherein the insulating layer further contains a thermoplastic resin having a melting point of 100 to 170° C.

8. The electrode for a non-aqueous electrolyte secondary battery according to claim 1, further comprising a porous thermoplastic resin layer that contains a thermoplastic resin having a melting point of 100 to 170° C.

9. The electrode for a non-aqueous electrolyte secondary battery according to claim 8, wherein the thermoplastic resin layer has a thickness of 1 to 15 μm.

10. A non-aqueous electrolyte secondary battery comprising:
    a positive electrode that includes a material mixture layer containing a positive electrode active material;
    a negative electrode that includes a material mixture layer containing a negative electrode active material; and
    a non-aqueous electrolyte,
    wherein at least one electrode selected from the positive electrode and the negative electrode includes a porous insulating layer,
    the insulating layer is formed on the material mixture layer,
    the insulating layer contains a resin having a cross-linked structure and inorganic particles,
    a mixed layer that includes components of the insulating layer and components of the material mixture layer is provided at an interface between the insulating layer and the material mixture layer, and
    the mixed layer has a thickness of 3 to 15 μm.

11. The non-aqueous electrolyte secondary battery according to claim 10, wherein the insulating layer has a surface roughness Ra of 0.2 to 0.4 μm.

12. The non-aqueous electrolyte secondary battery according to claim 10, wherein the insulating layer has a thickness of 3 to 50 μm.

13. The non-aqueous electrolyte secondary battery according to claim 10, wherein in the insulating layer, a content of the resin having the cross-linked structure is 35 to 75 vol %, and a content of the inorganic particles is 25 to 65 vol %.

14. The non-aqueous electrolyte secondary battery according to claim 10, wherein an insulating resin layer is further provided on at least a part of an end portion of the electrode.

15. The non-aqueous electrolyte secondary battery according to claim 14, wherein the insulating resin layer is disposed at a position corresponding to a current collector tab of a counter electrode or a self-electrode.

16. The non-aqueous electrolyte secondary battery according to claim 10, wherein the insulating layer further contains a thermoplastic resin having a melting point of 100 to 170° C.

17. The non-aqueous electrolyte secondary battery according to claim 10, wherein a porous thermoplastic resin layer that contains a thermoplastic resin having a melting point of 100 to 170° C. is further provided on a surface of the electrode.

18. The non-aqueous electrolyte secondary battery according to claim 17, wherein the thermoplastic resin layer has a thickness of 1 to 15 μm.

19. The non-aqueous electrolyte secondary battery according to claim 10, wherein the insulating layer is formed on the material mixture layer of the negative electrode.

20. The non-aqueous electrolyte secondary battery according to claim 10, wherein the negative electrode includes as the negative electrode active material a graphite carbon material and a material containing silicon as a constituent element.

21. The non-aqueous electrolyte secondary battery according to claim 10, wherein a polyurethane microporous film or a polyethylene terephthalate nonwoven fabric is further provided between the positive electrode and the negative electrode.

* * * * *